United States Patent
Wang et al.

(10) Patent No.: US 12,030,187 B2
(45) Date of Patent: Jul. 9, 2024

(54) ROBOT SYSTEM

(71) Applicant: FANUC CORPORATION, Yamanashi (JP)

(72) Inventors: Kaimeng Wang, Yamanashi (JP); Wenjie Chen, Yamanashi (JP); Tetsuaki Kato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 310 days.

(21) Appl. No.: 16/503,865

(22) Filed: Jul. 5, 2019

(65) Prior Publication Data
US 2020/0023518 A1 Jan. 23, 2020

(30) Foreign Application Priority Data

Jul. 17, 2018 (JP) .................. 2018-134393

(51) Int. Cl.
*B25J 9/16* (2006.01)

(52) U.S. Cl.
CPC ........... *B25J 9/1666* (2013.01); *B25J 9/1653* (2013.01)

(58) Field of Classification Search
CPC . B25J 9/16; B25J 9/1628; B25J 9/1664; B25J 9/1656; B25J 9/1666; B25J 9/1653; B25J 13/08; B25J 13/088; B25J 13/089; B25J 19/02; B25J 19/021; B25J 19/023; G05B 2219/39; G05B 2219/39082
USPC ........................................................ 700/255
See application file for complete search history.

(56) References Cited

U.S. PATENT DOCUMENTS

| | | | |
|---|---|---|---|
| 8,442,714 B2 | 5/2013 | Matsukawa et al. | |
| 2004/0138780 A1 | 7/2004 | Lewis | |
| 2006/0095160 A1 | 5/2006 | Orita et al. | |
| 2007/0150093 A1* | 6/2007 | Nagatsuka | B25J 9/1682 700/235 |
| 2008/0114492 A1 | 5/2008 | Miegel et al. | |
| 2009/0043440 A1* | 2/2009 | Matsukawa | G05D 1/0238 701/25 |

(Continued)

FOREIGN PATENT DOCUMENTS

| | | |
|---|---|---|
| CN | 102152308 A | 8/2011 |
| CN | 102792238 A1 | 11/2012 |

(Continued)

OTHER PUBLICATIONS

Miseikis, "Multi 3D Camera Mapping for Predictive and Reflexive Robot Manipulator Trajectory Estimation", 2016 (Year: 2016).*

(Continued)

*Primary Examiner* — Khoi H Tran
*Assistant Examiner* — Sarah A Tran
(74) *Attorney, Agent, or Firm* — KARCESKI IP LAW, PLLC

(57) ABSTRACT

A robot system includes: a feature point position detection unit configured to detect, at a constant cycle, a position of a feature point of an obstacle that moves or deforms within a motion range of a robot; a movement path calculation unit configured to calculate a movement path of the robot before a motion of the robot; a mapping function derivation unit configured to derive a mapping function based on a position of the feature point that is detected at a time interval; and a path adjustment unit configured to dynamically adjust the movement path of the robot using the derived mapping function.

3 Claims, 3 Drawing Sheets

(56) References Cited

U.S. PATENT DOCUMENTS

| | | | |
|---|---|---|---|
| 2009/0326711 | A1 | 12/2009 | Chang et al. |
| 2010/0070078 | A1* | 3/2010 | Kong .................. G05D 1/0274 901/1 |
| 2012/0215351 | A1 | 8/2012 | McGee et al. |
| 2015/0100194 | A1 | 4/2015 | Terada |
| 2015/0190926 | A1 | 7/2015 | Miegel et al. |
| 2017/0210008 | A1 | 7/2017 | Maeda |
| 2018/0250818 | A1* | 9/2018 | Maeda .................. B25J 9/1682 |
| 2019/0143518 | A1 | 5/2019 | Maeda |
| 2020/0139545 | A1* | 5/2020 | Hayashi ................ B25J 9/1664 |

FOREIGN PATENT DOCUMENTS

| | | |
|---|---|---|
| CN | 103568008 A | 2/2014 |
| CN | 106325280 A | 1/2017 |
| CN | 106573377 A | 4/2017 |
| CN | 107139171 A | 9/2017 |
| CN | 107756423 A | 3/2018 |
| CN | 108255173 A | 7/2018 |
| DE | 602005006126 T2 | 7/2009 |
| DE | 102012103830 A1 | 11/2012 |
| EP | 1798618 A2 | 6/2007 |
| EP | 3195990 A1 | 7/2017 |
| JP | H07271415 A | 10/1995 |
| JP | 2007164417 A | 6/2007 |
| JP | 2007253770 A | 10/2007 |
| JP | 2010142910 A | 7/2010 |
| JP | 2011253377 A | 12/2011 |
| JP | 2012130986 A * | 7/2012 |
| JP | 2012130986 A | 7/2012 |
| JP | 2012242967 A | 12/2012 |
| JP | 2013086234 A | 5/2013 |
| JP | 2013193194 A | 9/2013 |
| JP | 2014123200 A | 7/2014 |
| JP | 2015160253 A | 9/2015 |
| JP | 2017131973 A | 8/2017 |
| JP | 6282140 B2 * | 2/2018 |
| JP | 2018103345 A | 7/2018 |
| WO | 2005124486 A2 | 12/2005 |
| WO | 2013140236 A1 | 9/2013 |

OTHER PUBLICATIONS

Japanese Notice of Reasons for Refusal dated Jul. 21, 2020, for Japanese Patent Application No. 2018134393.

Japanese Search Report by Registered Search Organization dated Jul. 21, 2020, for Japanese Patent Application No. 2018134393.

German Office Action dated Mar. 21, 2022, for German Patent Application No. 10 2019 118 202.6.

Chinese Office Action dated Jan. 4, 2024, for Chinese Patent Application No. 201910628389.7.

* cited by examiner

ROBOT SYSTEM

CROSS-REFERENCE TO RELATED APPLICATIONS

This application claims priority to and the benefit of Japanese Patent Application No. 2018-134393, filed on Jul. 17, 2018, the entire content of which is incorporated herein by reference.

FIELD OF THE INVENTION

The present invention relates to a robot system.

BACKGROUND OF THE INVENTION

There has conventionally been known a robot system including a plurality of robots, in which an interference area is set between the robots, and a robot waits outside the interference area when another robot is present in the interference area until the interference area becomes empty, that is, so-called interlock is set (see, e.g., Japanese Unexamined Patent Application, Publication No. 2007-164417).

SUMMARY OF THE INVENTION

An aspect of the present invention is a robot system including: a feature point position detection unit configured to detect, at a constant cycle, a position of a feature point of an obstacle that moves or deforms within a motion range of a robot; a movement path calculation unit configured to calculate a movement path of the robot before a motion of the robot; a mapping function derivation unit configured to derive a mapping function based on a position of the feature point that is detected at a time interval; and a path adjustment unit configured to dynamically adjust the movement path of the robot using the derived mapping function.

DESCRIPTION OF EMBODIMENT(S) OF THE INVENTION

A robot system 1 according to an embodiment of the present invention will be described below with reference to the drawings.

Figure 1:
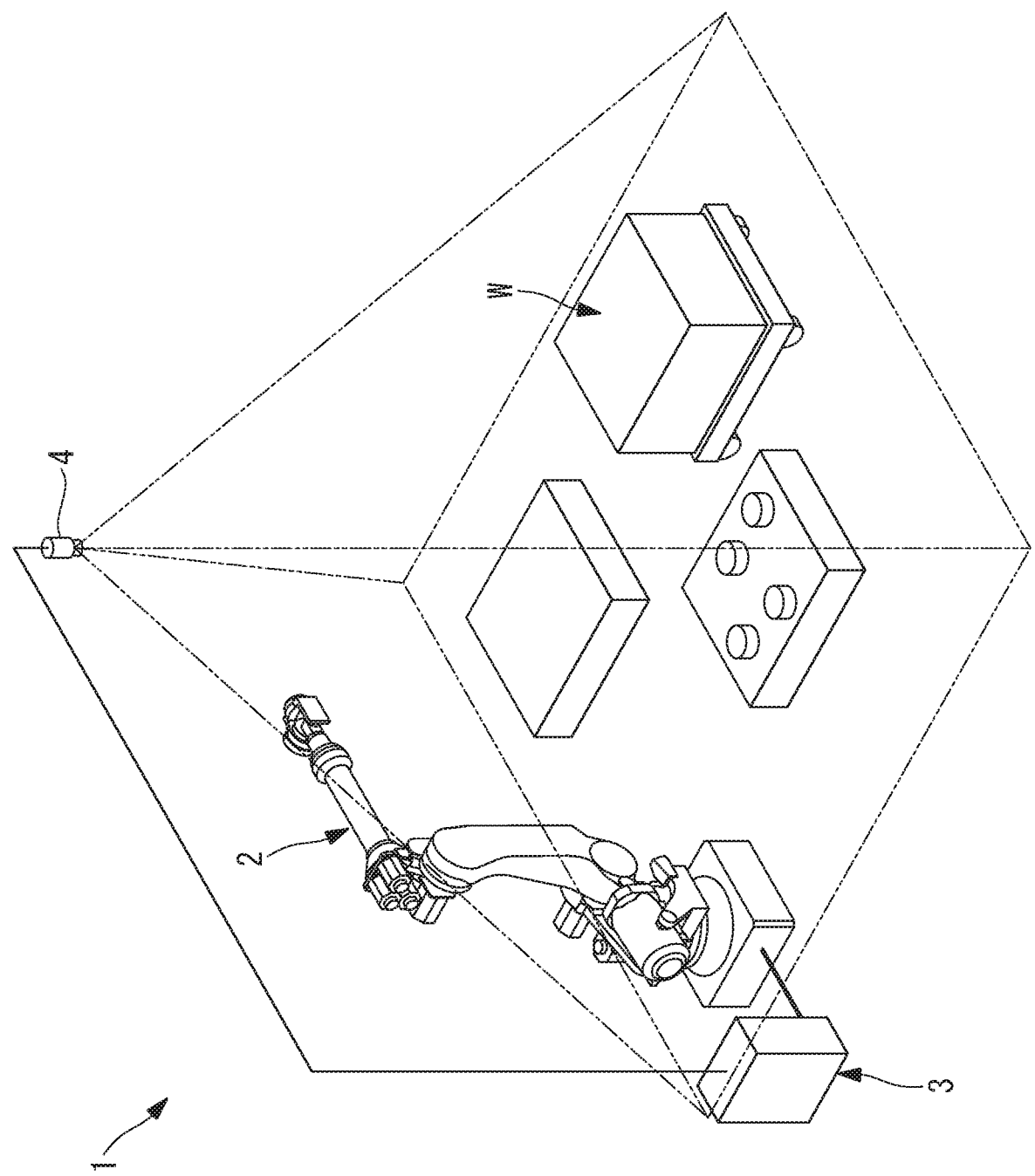
FIG. 1 is an overall configuration diagram showing a robot system according to an embodiment of the present invention.

As shown in FIG. 1, the robot system 1 according to this embodiment includes a robot 2, a controller 3 configured to control the robot 2, and a camera 4 arranged above the robot 2 and configured to capture an image of an area including the entire motion range of the robot 2.

An obstacle W that moves within the motion range of the robot 2 includes an unmanned transfer wagon, a human being, or another robot that moves along a route passing through the motion range of the robot 2.

Figure 2:
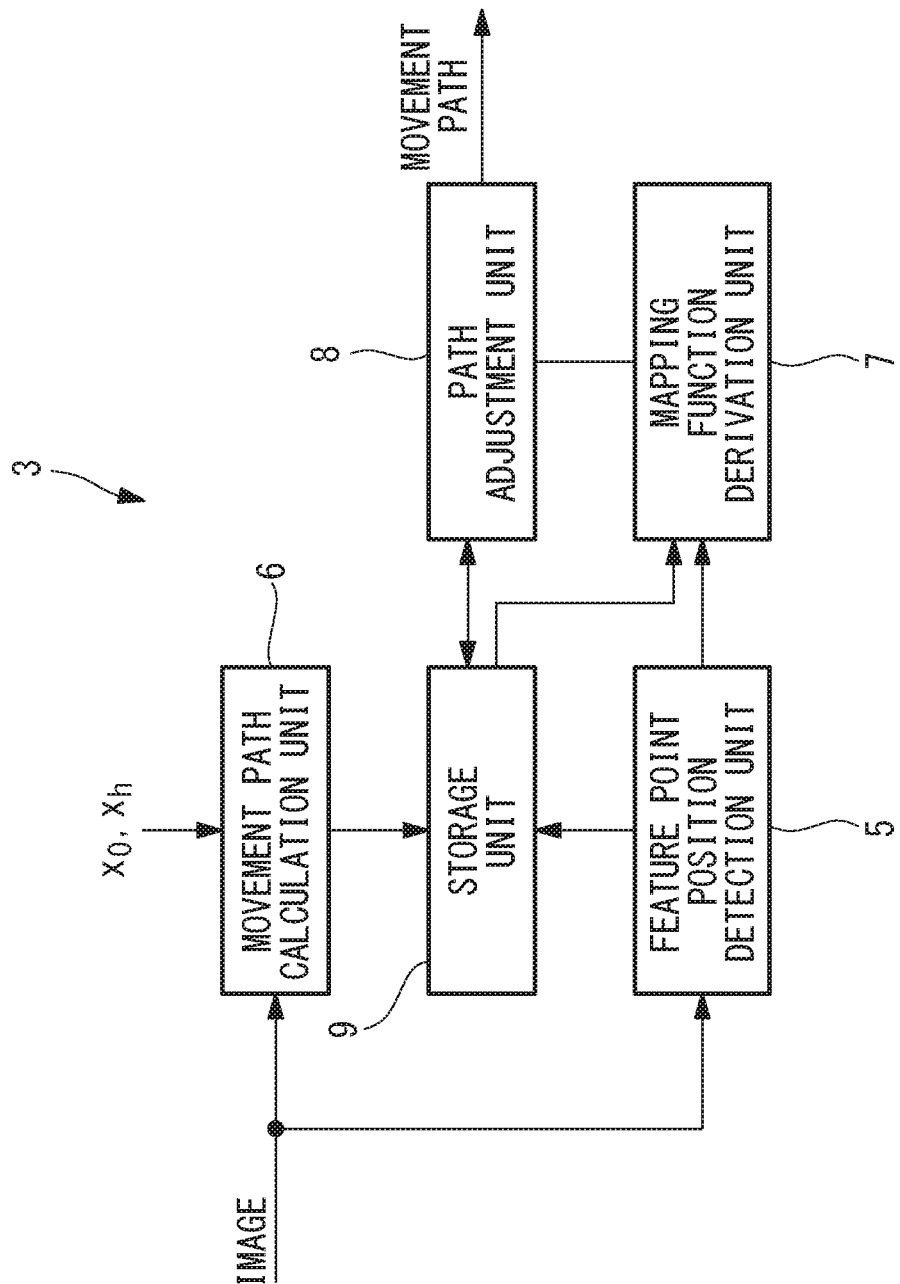
FIG. 2 is a block diagram for explaining a controller of the robot system in FIG. 1.

As shown in FIG. 2, the controller 3 includes: a feature point position detection unit 5 configured to process an image captured by the camera 4 to detect the obstacle W, and detect the position of a feature point of the obstacle W; a movement path calculation unit 6 configured to calculate an initial movement path based on the position of the feature point of the obstacle W that is detected in a state before a motion of the robot 2; a storage unit 9 configured to store the detected position of the feature point and the calculated movement path; a mapping function derivation unit 7 configured to derive a mapping function based on the position of the feature point of the obstacle W that is detected during a motion of the robot 2 at a time interval; and a path adjustment unit 8 configured to dynamically adjust the movement path of the robot 2 using the derived mapping function. The controller 3 is composed of a processor and a memory.

Figure 3:
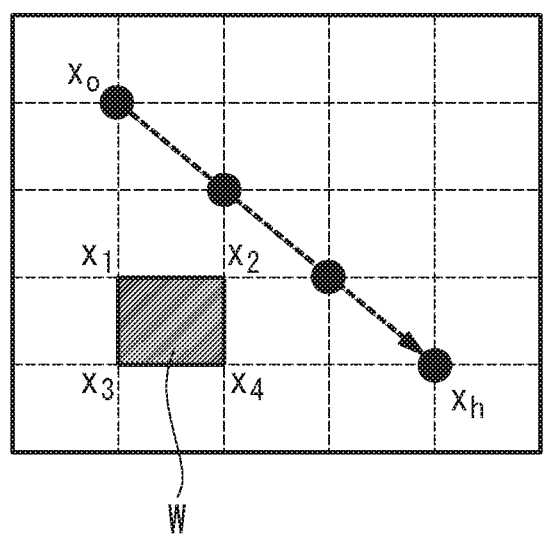
FIG. 3 shows an example of the positions of feature points of an obstacle in an image captured by a camera of the robot system in FIG. 1 before a motion of a robot, and an initial movement path of the robot.

For example, as shown in FIG. 3, when the obstacle W is a rectangle in a planar view, the feature point position detection unit 5 uses the four vertices of the rectangle as feature points to detect their coordinates.

Given a start point and an end point of a motion of the robot 2, the movement path calculation unit 6 calculates such a movement path as to be the shortest under limiting conditions of the velocity and acceleration of the robot 2, and a distance between the robot 2 and the obstacle W.

Specifically, the movement path calculation unit 6 optimizes the movement path according to Expressions (1)-(4):

$$\min_x J = \omega \sum_t p_t^2 \qquad (1)$$

$$x_0 = x^{start}, x_h = x^{goal} \qquad (2)$$

$${}^v\min \leq Vx \leq {}^v\max, {}^a\min \leq Ax \leq {}^a\max \qquad (3)$$

$$d(x_q, O_q) \geq d_{min}, \forall_q = 1, \ldots h-1. \qquad (4)$$

Here, in Expression (1), J is an evaluation function, t is an interpolation number, $p_t$ is a distance at t-th interpolation, and ω is a weight, and the movement path is optimized by minimization according to Expression (1).

Expression (2) is a limiting condition specifying the start point $x_0$ and the end point $x_h$ of the movement path.

Expression (3) is a limiting condition specifying that the velocity $V_x$ and the acceleration $A_x$ of the robot 2 fall within predetermined ranges.

Expression (4) is a limiting condition specifying that a distance $d(x_q, O_q)$ between a point $x_q$ on the movement path and a surface $O_q$ of the obstacle W is equal to or greater than a predetermined threshold $d_{min}$ for all q.

Figure 4:
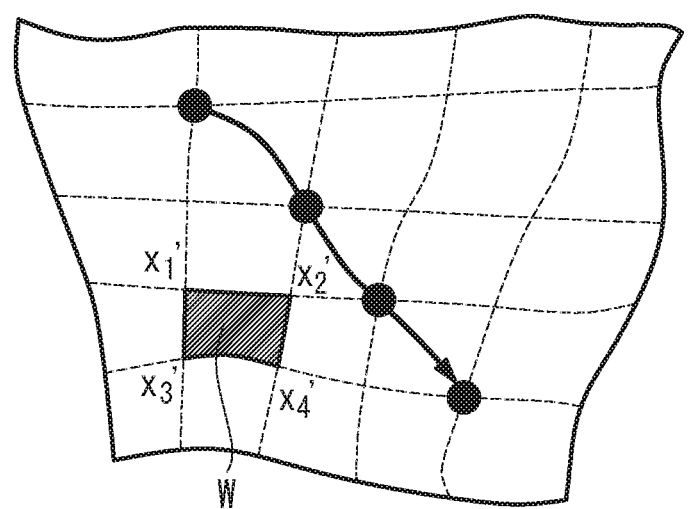
FIG. 4 shows an example of the positions of the feature points of the obstacle in an image captured by the camera of the robot system in FIG. 1 during a motion of the robot, and an adjusted movement path.

For example, as shown in FIG. 4, in an image captured by the camera 4 during a motion of the robot 2 at a time interval, the mapping function derivation unit 7 derives, based on the positions $x_1$, $x_2$, $x_3$, $x_4$ of the feature points of the obstacle W before movement and the positions $x_1'$, $x_2'$, $x_3'$, $x_4'$ of the feature points of the obstacle W after the movement in the case where the obstacle W has moved (and deformed), a non-linear mapping function f for displacing the positions $x_1$, $x_2$, $x_3$, $x_4$ to the positions $x_1'$, $x_2'$, $x_3'$, $x_4'$. For example, the mapping function f is calculated using Expression (5):

$$f = \arg\min_f \sum_k \left\| f(x^{(k)}) - x^{(k)'} \right\|^2 + \qquad (5)$$

-continued $$\int_{x1}\int_{x2}\left[\left(\frac{\partial^2 f}{\partial x_1^2}\right)^2 + 2\left(\frac{\partial^2 f}{\partial x_1 \partial x_2}\right)^2 + \left(\frac{\partial^2 f}{\partial x_2^2}\right)^2\right]dx_1\ dx_2$$

Here, f denotes the mapping function, k denotes a feature point number 1-4, $x^{(k)}$ denotes $x_k$, and $x_1$, $x_2$ denote directions orthogonal to each other in a horizontal plane.

The first term on the right side of Expression (5) is mapping accuracy, the second term is mapping smoothness, and a mapping function f that minimizes the sum of them is calculated.

The path adjustment unit 8 transforms the movement path of the robot 2 before the movement of the obstacle W using the mapping function to calculate a movement path of the robot 2 after the movement of the obstacle W.

The operation of the robot system 1 according to this embodiment configured in this way will be described below.

According to the robot system 1 related to this embodiment, an image is captured by the camera 4 before moving the robot 2, and is input to the movement path calculation unit 6 and the feature point position detection unit 5. In the movement path calculation unit 6, the start point $x_0$ and the end point $x_h$ of the movement path of the robot 2 are input in addition to the input image, so that an initial movement path is calculated by the movement path calculation unit 6 using Expressions (1)-(4), and is stored in the storage unit 9.

Expressions (1)-(4) calculate such a movement path as to be the minimum distance while satisfying limiting conditions specifying the input start point $x_0$ and end point $x_h$ of the movement path, specifying that the velocity $V_x$ and the acceleration $A_x$ of the robot 2 fall within the predetermined ranges, and specifying that the distance $d(x_q, O_q)$ between the point $X_q$ on the movement path and the surface $O_q$ on the obstacle W is equal to or greater than the threshold $d_{min}$. Although calculation of the movement path is a non-convex problem to require time to derive the solution, it does not affect a cycle time because it is before a motion of the robot 2, so it may be performed spending a sufficient amount of time.

In addition, when an image is input to the feature point position detection unit 5, the obstacle W in the image is extracted by image processing, and the positions $x_1$, $x_2$, $x_3$, $x_4$ of its feature points are detected. The detected positions $x_1$, $x_2$, $x_3$, $x_4$ of the feature points are stored in the storage unit 9.

When the optimized initial movement path is calculated by the movement path calculation unit 6, the robot 2 is moved from the start point $x_0$ along the movement path. Then, images are sequentially captured by the camera 4 during this motion, and the second captured image is input to the feature point position detection unit 5.

Image processing similar to that of the first image is performed on the second image in the feature point position detection unit 5, so that the positions $x_1'$, $x_2'$, $x_3'$, $x_4'$ of the feature points are detected. The detected new positions $x_1'$, $x_2'$, $x_3'$, $x_4'$ of the feature points are also stored in the storage unit 9.

The newly detected positions $x_1'$, $x_2'$, $x_3'$, $x_4'$ of the feature points of the obstacle W and the positions $x_1$, $x_2$, $x_3$, $x_4$ of the feature points of the obstacle W in the previous image stored in the storage unit 9 are input to the mapping function derivation unit 7, and a mapping function f that is a transform function from the positions $x_1$, $x_2$, $x_3$, $x_4$ to the positions $x_1'$, $x_2'$, $x_3'$, $x_4'$ is calculated using Expression (5).

Then, the calculated mapping function f is input to the path adjustment unit 8, and the previous movement path calculated by the movement path calculation unit 6 and stored in the storage unit 9 is read and transformed by the mapping function f into a new movement path.

Calculation of the mapping function f and adjustment of the movement path using the mapping function f can be performed in a short calculation time, and can be executed in real time without affecting the cycle time. In addition, since adjustment of the movement path during the motion is performed in the form of adjusting the initial movement path optimized first, and the subsequent adjustment is also performed based on the movement path generated at the previous time, there is an advantage that the adjusted movement path approximates the optimized movement path to be able to improve productivity.

Thus, the robot system 1 according to this embodiment has an advantage of being able to improve productivity while avoiding mutual interference when there is an obstacle W such as another robot or a human being that moves within the motion range. In addition, by using a non-linear mapping function as the mapping function f, it is possible to deal with not only a case where the obstacle W performs translational movement, but also a case where the obstacle W rotates, or a case where the shape of the obstacle W changes like a robot or a human being.

Note that although this embodiment has exemplified the use of a non-linear mapping function as the mapping function f, it is not limited to this, and for example, when the obstacle W performs only translational movement, a linear transform matrix may be used as the mapping function f.

In addition, although the initial movement path has been optimized by minimizing the path, it is alternatively or additionally possible to optimize the movement path using at least one of maximization of the life time of a reducer, minimization of the accuracy of the path, minimization of power consumption, and minimization of vibration.

For example, the maximization of the life time of the reducer can be evaluated using Expression (6):

$$\max L_h = K \times \frac{N_o}{N_m} \times \left(\frac{T_o}{T_m}\right)^{10/3} \qquad (6)$$

Here, L denotes a life time, K denotes a rated life time, $N_O$ denotes rated rotational velocity, $N_m$ denotes actual average rotational velocity, $T_O$ denotes rated torque, and $T_m$ denotes actual average torque.

In addition, for example, minimization of the accuracy of the path can be evaluated using Expression (7):

$$\min J = \sum_t (x_t - x_t')^2 \qquad (7)$$

Here, $x_t$ is a commanded position at a time t, and $x_t'$ is an actual position at the time t measured by a sensor.

In addition, for example, minimization of power consumption can be evaluated by Expression (8):

$$\min W = \sum_t [(N_t \cdot v_t)^2 + K_t] \qquad (8)$$

Here, $N_t$ is torque at the time t, $v_t$ is motor velocity at the time t, and $K_t$ is copper loss and iron loss at the time t.

In addition, for example, minimization of vibration can be evaluated using Expression (9):

$$\min J = \sum_t (a_t - a_t')^2 \quad (9)$$

Here, $a_t$ is a commanded acceleration at the time t, and $a_t'$ is an actual acceleration at the time t measured by a sensor. The status of the vibration can be represented by the magnitude of the acceleration.

In addition, although this embodiment has exemplified, as the mapping function f, a two-dimensional mapping function based on a two-dimensional image captured by a two-dimensional camera that is the camera 4, a three-dimensional mapping function f may alternatively be derived based on a three-dimensional image captured by a three-dimensional camera using Expression (10):

$$f = \arg \min_f \sum_k \left\| f(x^{(k)}) - x^{(k)\prime} \right\|^2 + \quad (10)$$

$$\int_{x1}\int_{x2}\int_{x3}\left[\left(\frac{\partial^3 f}{\partial x_1^3}\right)^2 + \left(\frac{\partial^3 f}{\partial x_2^3}\right)^2 + \left(\frac{\partial^3 f}{\partial x_3^3}\right)^2 + \right.$$

$$2\left(\frac{\partial^3 f}{\partial x_1^2 \partial x_2}\right)^2 + 2\left(\frac{\partial^3 f}{\partial x_2^2 \partial x_3}\right)^2 +$$

$$\left. 2\left(\frac{\partial^3 f}{\partial x_3^2 \partial x_1}\right)^2 + 2\left(\frac{\partial^3 f}{\partial x_1 \partial x_2 \partial x_3}\right)^2 \right] dx_1 \, dx_2 dx_3$$

Here, $x_3$ is a direction orthogonal to the directions $x_1$ and $x_2$.

From the above-described embodiment, the following invention is derived.

An aspect of the present invention is a robot system including: a feature point position detection unit configured to detect, at a constant cycle, a position of a feature point of an obstacle that moves or deforms within a motion range of a robot; a movement path calculation unit configured to calculate a movement path of the robot before a motion of the robot; a mapping function derivation unit configured to derive a mapping function based on a position of the feature point that is detected at a time interval; and a path adjustment unit configured to dynamically adjust the movement path of the robot using the derived mapping function.

According to this aspect, the position of the feature point of the obstacle is detected by the feature point position detection unit before a motion of the robot, and the detected position of the feature point is used by the movement path calculation unit to calculate an initial movement path of the robot. While the robot is moving based on the calculated movement path, the position of the feature point of the obstacle is sequentially detected by the feature point position detection unit at a constant cycle, and the obstacle moves or deforms, so that the position of the feature point changes. The mapping function derivation unit derives a mapping function that maps the position of the feature point of the obstacle before movement or deformation to the position of the feature point of the obstacle after the movement. Then, the path adjustment unit dynamically adjusts the current movement path using the derived mapping function. This makes it possible to improve productivity while avoiding mutual interference when performing collaborative work, with another robot or a person being present in a motion range.

In the above aspect, the movement path calculation unit may calculate the movement path that is optimized under a limiting condition of a start point and an end point of a movement of the robot, and a distance between the robot and the obstacle.

By this configuration, the movement path adjusted based on the movement of the obstacle becomes an optimum movement path capable of avoiding interference between the moving obstacle and the robot without changing the start point and the end point of the movement of the robot. Although an operation for optimizing the movement path under a predetermined constraint condition is a non-convex problem that requires operation time and therefore is difficult to perform in real-time, it is possible to spend a relatively long time in an operation of an initial movement path before moving the robot, so that an optimum initial movement path can effectively be set.

In addition, in the above aspect, the movement path calculation unit may calculate the movement path that achieves at least one of maximization of a life time of a reducer of the robot, and minimization of a movement path, power consumption, path accuracy, or vibration.

This configuration makes it possible to maximize the life time of the reducer or minimize the movement path, power consumption, path accuracy and vibration by moving the robot along the calculated movement path.

The invention claimed is:

1. A robot system, comprising:
    a robot that is disposed at a predetermined position and that includes a movable part, the movable part being operated within a range where there is an obstacle that moves;
    a camera that captures an image of an area including the obstacle;
    a processor connected to the camera; and
    a memory connected to the processor,
    wherein the processor is configured to:
        before the movable part is operated, detect a position of a feature point of the obstacle from the image captured by the camera, calculate a motion path of the moveable part based on the detected position of the feature point and store the calculated motion path in the memory;
        while the movable part is operated along the motion path stored in the memory, cause the camera to capture, at predetermined time intervals, the image and sequentially detect the position of the feature point from the captured image;
        in response to newly detecting the position of the feature point, derive a mapping function for displacing a previously detected position of the feature point to the newly detected position of the feature point; and
        in response to deriving the mapping function, adjust the motion path stored in the memory using the derived mapping function.

2. The robot system according to claim 1, wherein the processor is configured to calculate the motion path that is optimized under a limiting condition of a start point and an end point when the movable part is operated, and a distance between the robot and the obstacle.

3. The robot system according to claim 2, wherein the processor is configured to calculate the motion path that achieves at least one of maximization of a life time of a reducer of the robot, and minimization of a motion path, power consumption, path accuracy, or vibration.

* * * * *